MULTI-FREQUENCY SIGNAL GENERATION

Filed March 27, 1968 2 Sheets-Sheet 1

INVENTOR.
EARL F. CARLOW
BY
Mueller, Aichele & Rauner
ATTORNEYS

June 30, 1970 E. F. CARLOW 3,518,552

MULTI-FREQUENCY SIGNAL GENERATION

Filed March 27, 1968 2 Sheets-Sheet 2

INVENTOR.
EARL F. CARLOW

BY

Mueller, Aichele & Rauner
ATTORNEYS

United States Patent Office 3,518,552
Patented June 30, 1970

3,518,552
MULTI-FREQUENCY SIGNAL GENERATION
Earl F. Carlow, Scottsdale, Ariz., assignor to Motorola, Inc., Franklin Park, Ill., a corporation of Illinois
Filed Mar. 27, 1968, Ser. No. 716,633
Int. Cl. H03k *21/00*
U.S. Cl. 328—43 11 Claims

ABSTRACT OF THE DISCLOSURE

A clock driven shift-register counter consists of a chain of interconnected J–K flip-flops with gating means interposed between selected ones of the flip-flops in the chain. Such gating means are jointly controlled by an input data signal and the state of the shift-register counter. Depending upon the data input, the modulus of the counter is selectively altered such that the counter output signal varies in frequency in accordance with the changing modulus of the counter.

The invention described herein was made under a subcontract with the United States Government, Air Force Systems Command, Electronic Systems Division.

Background of the invention

This invention relates to multifrequency signaling systems, and, more particularly, to those of the frequency shift keying type.

Multifrequency signaling systems include the well known frequency shift keying (FSK) systems wherein two or more frequencies respectively represent different digital signal states, such as mark and space signals of radio teleprinter systems. When the two frequencies are not synchronous at the point of frequency shifting, extraneous frequencies can be introduced into signal channels whenever the system shifts from one frequency signal to another. For example, it is well known that the phases of signals have different frequencies which are not harmonically related (which is the case in most FSK systems), one with respect to the other. Therefore, when there is a random data input to the FSK system, there may be a change from one frequency signal to the other. When one signal is at maximum amplitude and the other is at zero amplitude, this sudden change appears as a transient in the system introducing extraneous undesired signals, commonly referred to as noise. If phase coherency is required before switching from one signal to the other signal, depending upon the separation of the two FSK signals, the precession rate would severely limit the data rate. The closer the frequencies are together, the slower the precession rate and, therefore, the slower the data rate. On the other hand, it is desired to have a narrow band-width signal with a high data rate for maximum use of the band width.

These opposing criteria impose the requirement of random switching between signals of the different frequencies but without generation of substantial extraneous signals. In systems having a plurality of closely spaced independent signal channels, transients as referred to above can cause undesired noise in adjacent channels. Therefore, in multi-channel narrow-band systems it is very important that the signals be switched without introduction of noise, such as when both signals have the same phase. Because of non-synchronous output signals, a receiver takes longer to make a decision as to what frequency is being received (due to the response of the filters) which results in jitter in the recovered modulation—termed as distortion.

In FSK systems, the above-referred to problems have been partially solved by synchronizing data signals with the frequency shifted signals and providing individual phase adjustments for the various frequency shifted signals. Such synchronous systems have used repetitive pulses as a clock; then arithmetically manipulated the pulses, as by adding or substracting pulses, to provide differing pulse rates for generating different frequency signals. To form FSK signals from such pulses of differing rates, a band-pass filter is used for reshaping the pulses into suitable communication channel signals.

Another approach in switching different frequency signals is to individually key one of a plurality of sine-wave generators whenever the modulating signals are at zero amplitude. This approach requires close control of the sine-wave generators and is usually operated wherein there is a harmonic relationship between the frequencies of the two signals. This latter approach is usually not suitable for frequency shift keying to signals that are closely spaced apart.

Another method is to switch between two crystal oscillators that provide frequencies to be divided by a common frequency-divider chain. This method divides the asynchronous effect by the frequency-dividing factor in the divider chain; but there are still asynchronous qualities in the output signals.

Digital frequency dividers driven by a single oscillator have been utilized to generate differing frequencies for FSK type of signals. In such dividers there are either a plurality of separate frequency-dividing networks of an arithmetic operation, i.e., subtraction or addition, is performed. The dividers supply different pulse repetitive frequencies to a band-pass signal for forming the different frequency signals.

Summary of the invention

It is an object of the present invention to provide an improved multifrequency signaling system capable of asynchronously providing complete phase coherent modulation between two different frequency signals without introducing transients into a communication channel.

A feature of this invention is the provision of a clock pulse source supplying signals, such as pulses, to a digital logic frequency dividing network. The frequency dividing network operates at the clock frequency of the supplied clock signals. Logic means are provided in the frequency dividing network to alter its logic of operation.

Another feature of the present invention is the provision of a shift-register type of counter having gating stages interspersed within a chain of multistable state devices forming a shift-register counter having a controllable modulus. The logic sequence of counting is determined by data signals affecting the logic means associating with the shift-register counter. Another feature is the provision of J–K flip-flops combined with NAND circuits for providing a shift-register counter-type frequency generator which is shiftable between two logic arrangements for providing a two-modulus frequency divider. Both modulus may be prime members.

Another feature is the provision in a shift-register type of multifrequency generator of a lock-up prevention circuit.

The drawing

Detailed description of the illustrative embodiment

Figure 1:
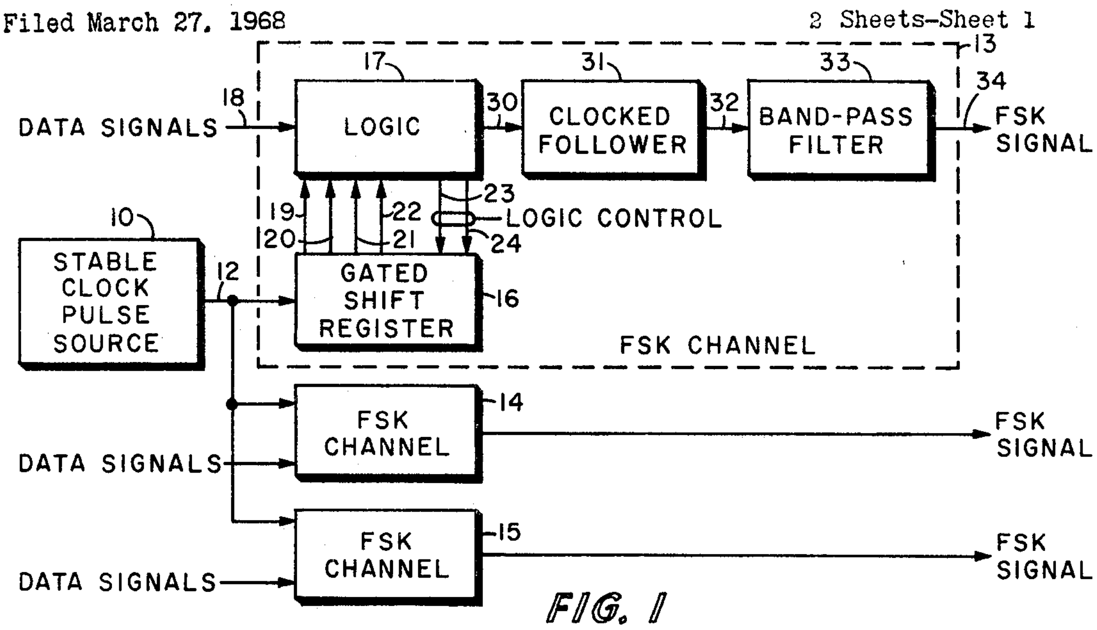
FIG. 1 is a block diagram of a multichannel frequency shift keying system utilizing the teaching of the present invention.

Like numbers indicate like parts and structural features in the various diagrams. A stable clock pulse source 10 (FIG. 1) supplies successive clock signals 11 (FIG. 4) over line 12 to three FSK channels 13, 14, and 15. Channel 13 is shown in detail, it being understood that channels 14 and 15 are identically constructed. Each channel includes a shift register 16 actuated by clock pulses 11. The sequence of a numeric count performed in shift register 16 is determined by logic circuit 17 which receives controlling data signals over line 18. As constructed, logic circuit 17 is responsive to NRZ signals; equivalent logic circuits are responsive to other forms of data signals. Logic circuit 17 also receives signals over lines 19, 20, 21, and 22 from shift register 16 which indicate the signal states of particular stages in shift register 16. Logic circuit 17 is jointly responsive to the data signals and to the indicated signal states to supply logic control signals over lines 23 and 24 which control gates within shift register 16 for selectively altering the logic of counting. Logic circuit 17 detects a predetermined counting state wtihin shift register 16 to emit an output signal over line 30 to clocked follower 31. Clocked follower 31 receives clock pulse signals from line 12 and synchronously changes its signal state to supply a variable frequency signal 35, as later described, over line 32 to band-pass filter 33 which shapes the signal into a sine-type wave 34. Wave 34 is the FSK signal. The shift register in channels 14 and 15 each may have a unique modulus to use different FSK channel assignments.

In a constructed embodiment of the illustrated multi-frequency signaling system, two different frequency signals were utilized in a binary transmission system. The signal frequencies were separated by 85 Hz. In one channel the frequency of the first FSK signal was 1317.5 Hz. while the second FSK signal had a frequency of 1232.5 Hz. In the communication arts, the specification for such a communication channel is 1275±42.5 Hz. For present-day digital FSK signals used for telemetric applications, the below Table I indicates the frequency selections, the frequency specifications with the corresponding frequency dividing factors in the right-hand column for the lower or first signal frequency and the upper or second signal frequency as would be used.

TABLE I

| Center Frequency, Hz. | Frequency Shift, Hz. | Crystal Oscillator Frequency, Hz. | Frequency Division Factors |
|---|---|---|---|
| 425 | ±42.5 | 4,207.5 | 11, 9 |
| 595 | ±42.5 | 8,287.5 | 15, 13 |
| 765 | ±42.5 | 13,727.5 | 19, 17 |
| 935 | ±42.5 | 20,527.5 | 23, 21 |
| 1,105 | ±42.5 | 28,687.5 | 27, 25 |
| 1,275 | ±42.5 | 38,207.5 | 31, 29 |
| 1,445 | ±42.5 | 49,087.5 | 35, 33 |
| 1,615 | ±42.5 | 61,327.5 | 39, .37 |
| 1,785 | ±42.5 | 74,927.5 | 43, 41 |
| 1,955 | ±42.5 | 89,887.5 | 47, 45 |
| 2,125 | ±42.5 | 106,207.5 | 51, 49 |
| 2,295 | ±42.5 | 123,887.5 | 55, 53 |
| 2,465 | ±42.5 | 142,927.5 | 59, 57 |
| 2,635 | ±42.5 | 163,327.5 | 63, 61 |
| 2,805 | ±42.5 | 185,087.5 | 67, 65 |
| 2,975 | ±42.5 | 208,207.5 | 71, 69 |
| 3,145 | ±42.5 | 232,687.5 | 75, 73 |
| 3,315 | ±42.5 | 258,527.5 | 79, 77 |

In the above table, the frequency dividing factors are the smallest factors, i.e., factors representing the smallest amount of equipment to implement the invention.

Figure 2:
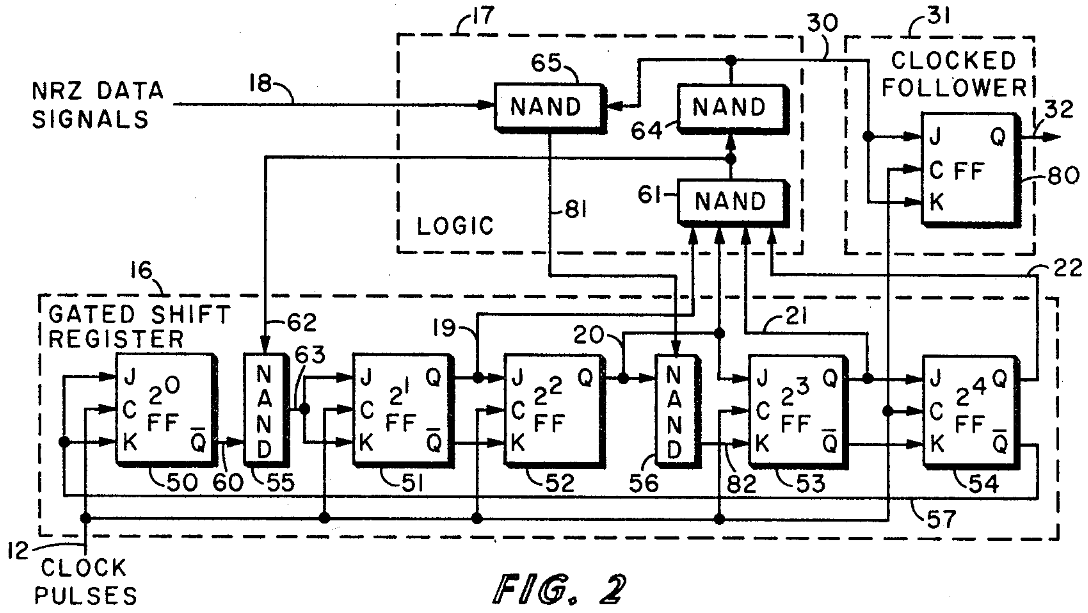
FIG. 2 is a signal flow block diagram of an exemplary channel usable with the FIG. 1 illustrated embodiment.
Figure 3:
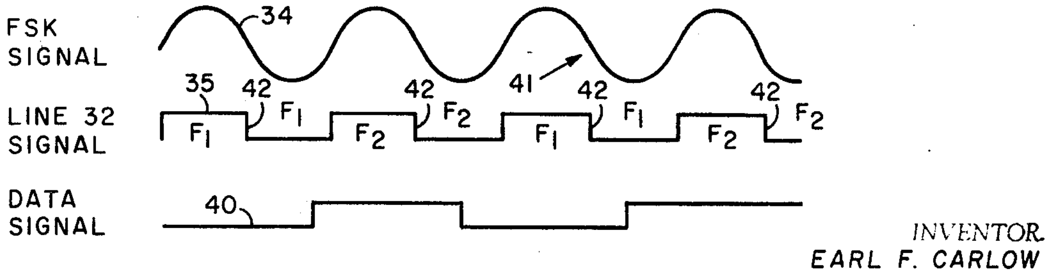
FIG. 3 shows a set of idealized waveforms illustrating the operation of the FIG. 2 channel.

An FSK signal generating channel is shown in FIG. 2 which is capable of generating FSK signals meeting the above specifications with frequency shifting always occurring on the same part of the cycle. Other channels can be constructed to FIG. 2 but with different counter moduli to effect different frequency division factors. The data signal 40 (FIG. 3) is supplied over line 18 to logic circuit 17. As shown, the channel will shift between frequencies F1 and F2 as illustrated by waveform 35 whenever the filtered signal 34 is at the zero axis crossing; no limitation thereto is intended. This is an idealized case. In a practical embodiment several (5 to 15) cycles of carrier frequency are required per data bit rather than the illustrated one cycle of carrier per one bit signal of data. The data signal 40 goes from a relatively negative to a relatively positive potential causing logic circuit 17 to effect a change in frequency from F1 to F2 (a lower frequency). At the negative going portions 42 of signal 35 the data signal 40 is sampled to determine the frequency wave 34 in the next occurring cycle.

The counting state sequences for each cycle of count performed by shift register 16 and associated logic circuit 17 are illustrated below in Table II.

TABLE II.—SHIFT REGISTER COUNTING STATES

| Counter Stage | | | | | | |
|---|---|---|---|---|---|---|
| $2^0$ | $2^1$ | $2^2$ | $2^3$ | $2^4$ | Numeric Values, Base Ten | Counting State Period |
| Successive Counting States, Base Two | | | | | | |
| 0 | 0 | 0 | 0 | 0 | 0 | 0 |
| 1 | 0 | 0 | 0 | 0 | 1 | 1 |
| 0 | 1 | 0 | 0 | 0 | 2 | 2 |
| 1 | 1 | 1 | 0 | 0 | 7 | 3 |
| 0 | 0 | 1 | 1 | 0 | 12 | 4 |
| 1 | 0 | 0 | 1 | 1 | 25 | 5 |
| 1 | 1 | 0 | 0 | 1 | 19 | 6 |
| 1 | 0 | 1 | 0 | 0 | 5 | 7 |
| 0 | 1 | 0 | 1 | 0 | 10 | 8 |
| 1 | 1 | 1 | 0 | 1 | 23 | 9 |
| 1 | 0 | 1 | 1 | 0 | 13 | 10 |
| 0 | 1 | 0 | 1 | 1 | 26 | 11 |
| 0 | 1 | 1 | 0 | 1 | 22 | 12 |
| 0 | 1 | 1 | 1 | 0 | 14 | 13 |
| 1 | 1 | 1 | 1 | 1 | 31 | 14 |
| 1 | 0 | 1 | 1 | 1 | 29 | 15* |
| 1 | 1 | 0 | 1 | 1 | 27 | 16* |
| 1 | 0 | 1 | 0 | 1 | 21 | 17 |
| 1 | 1 | 0 | 1 | 0 | 11 | 18 |
| 0 | 0 | 1 | 0 | 1 | 20 | 19 |
| 0 | 0 | 0 | 1 | 0 | 8 | 20 |
| 1 | 0 | 0 | 0 | 1 | 17 | 21 |
| 1 | 1 | 0 | 0 | 0 | 3 | 22 |
| 0 | 0 | 1 | 0 | 0 | 4 | 23 |
| 1 | 0 | 0 | 1 | 0 | 9 | 24 |
| 0 | 1 | 0 | 0 | 1 | 18 | 25 |
| 0 | 1 | 1 | 0 | 0 | 6 | 26 |
| 1 | 1 | 1 | 1 | 0 | 15 | 27 |
| 0 | 0 | 1 | 1 | 1 | 28 | 28 |
| 0 | 0 | 0 | 1 | 1 | 24 | 29 |
| 0 | 0 | 0 | 0 | 1 | 16 | 30 |

From inspection of Table II, it is seen that the shift-register type counter is modulo 31. Shift register 16 has five J–K flip-flops, a maximum modulo 32. The counting state having a decimal numerical value 30, is termed a "lock-up state," as well be further described. Such counting state is not included in the normal sequence of counting states. The numeric values of the successive counting states do not follow in arithmetic progression; rather, the counting sequence is arbitrarily determined by the cooperative relationship between logic circuit 17 and gater shift register 16. To adjust shift register 16 counter from modulo 31 for obtaining the lower frequency signal to modulo 29 for obtaining the higher frequency signal, NAND gate 56 is responsive to logic circuit 17 for omitting or skipping counting states of clock periods 15* and 16*.

Before continuing with the discussion of the operation of channel 13, the logic operation of an individual J–K flip-flop 50 through 54 in gated shift register 16 is described. A J–K flip-flop usable with the present invention is described in the patent to Seelbach et al. No. 3,351,778. As described in that patent, a J–K flip-flop has a J-input, a K-input, and a clock input with normal and complementary outputs denoted by the characters Q and $\overline{Q}$. The logic of operation of a J–K flips-flop as set forth in Table III below:

TABLE III.—LOGIC OF J-K FLIP-FLOP

| Input Signals | | Old Flip-Flop State | New Flip-Flop State |
|---|---|---|---|
| J | K | Q | Q |
| 0 | | 0 | 0 |
| 1 | | 0 | 1 |
| | 0 | 1 | 1 |
| | 1 | 1 | 0 |

In the above table, the horizontal lines in the input signal columns indicate the new flip-flop state is independent of the indicated J or K input. The $\overline{Q}$ output of the J–K flip-flop is the opposite of the Q state. As arbitrarily used in this description, a binary one indicates a relatively positive signal, while a binary zero indicates a relatively negative signal. A binary zero is often referred to as "no signal."

The second logic element used in the illustrative embodiment is a so-called NAND gate. The logic of operation of a NAND gate is shown in Table IV below:

TABLE IV.—LOGIC OF NAND CIRCUIT

| Two Inputs | | | Three and More Inputs | |
|---|---|---|---|---|
| A | B | Output | Input | Output |
| 0 | 0 | 1 | All zeros | 1 |
| 0 | 1 | 1 | One input a zero | 1 |
| 1 | 0 | 1 | All 1's | 0 |
| 1 | 1 | 0 | | |

In the above table, it is seen that when all inputs to a NAND gate are ones, then a binary zero signal is supplied as an output signal; in all other instances a binary one output signal is supplied. Internal construction of a NAND gate is known to consist of an AND circuit receiving signals which then supply the "ANDED" logic signals to a signal inverting circuit, commonly referred to as a NOT circuit; thus the acronym NAND.

Operation of the FIG. 2 apparatus is explained with reference to the idealized digital waveforms of FIG. 4. The J–K flip-flop 50–54 signal states are shown by waveforms 70 through 74, respectively. These waveforms represent signals from the Q or normal outputs. The output signals of the NAND gates 55 and 56 are respectively shown as waveforms 75 and 76. These gated shift-register 16 NAND gates respectively provide "walk-out" from a lock-up state (later fully described) and alteration of counter modulus. The output signals of NAND gates 61, 64, and 65 of logic circuit 17 are respectively shown as waveforms 77, 78, and 79.

For purposes of discussion, assume that flip-flops 50 through 54 are in the reset or zero state; that is, a binary one signal is supplied through each of the complementary outputs of the J–K flip-flops while a binary zero signal is supplied through the normal Q outputs. When the flip-flops are in the one or set state, then a binary one signal is supplied from the normal Q output and a binary zero signal is supplied from the complementary $\overline{Q}$ output. Clock pulses 11 supplied over line 12 simultaneously actuate flip-flops 50 through 54 and clocked follower 31 such that the signal states of the various J–K flip-flops are synchronously switched up to the clock rate.

The first clock pulse (period 0) appearing on line 12 when all J–K flip-flops are reset, sets flip-flop 50. The complementary output signal of J–K flip-flop 54 is supplied over line 57 to both J–K inputs of J–K flip-flop 50. The logic result is that whenever J–K flip-flop 54 is reset, J–K flip-flop 50 toggles to the opposite state, i.e., it acts as a module two counter. Whenever J–K flip-flop 54 is in its set state, a binary zero signal is supplied over line 57 making J–K flip-flop 50 non-responsive to clock pulses 11.

The second occurring clock pulse 11 (clock period 1) resets or retoggles J–K flip-flop 50 and sets J–K flip-flop 51. After being set, J–K flip-flop 50 supplies a binary zero signal over line 60 to NAND gate 55. Simultaneously therewith, as will become apparent, NAND gate 61 in logic circuit 17 is supplying a binary zero signal over line 62 as the second input to NAND gate 55. Therefore, during clock period 1 (J–K flip-flop 50 is reset) NAND circuit 55 is supplying a binary one signal over line 63 to both J–K inputs of flip-flop 51, making it responsive to a clock pulse 11 during clock period 2 to become set. From inspection of the output signal of NAND gate 55, it is seen that it follows the signal state of J–K flip-flop 60. It should be remembered that the signal on line 60 is a complement of waveform 70, i.e., wherever waveform 70 is a binary zero signal, the signal on line 60 is a binary one signal. Accordingly, NAND gate 55 performs no gating function during normal operation of the shift-register counter. As will be described, its sole purpose is to provide a means for the shift-register counter to automatically leave the so-called "lock-up" state.

During clock period 2, J–K flip-flop 50 is reset while J–K flip-flop 51 is the only J–K flip-flop set. J–K flip-flop 51 reverses its signal state in response to a clock pulse only when J–K flip-flop 50 is set. This operation can be determined by inspection of Table II and waveforms in FIG. 4.

J–K flip-flop 52 has its J and K inputs respectively connected to a normal and complementary output of J–K flip-flop 51. With these interconnections, in the next occurring clock period J–K flip-flop 52 assumes the signal state of J–K flip-flop 51. Inspection of Table II and the waveforms in FIG. 4 clearly show this operation. Similarly, J–K flip-flop 54 follows the previous signal state of J–K flip-flop 53. The above-described logic operations effect the counting sequence in register 16 of Table II. NAND gate 56 causes the counter to selectively omit clock periods 15* and 16* for changing the counter from modulo 31 to modulo 29.

NAND gate 56 is co-jointly controlled by logic circuit 17 and J–K flip-flop 52. During clock period 14, the numeric count in shift register 16 is decimal 31, i.e., all J–K flip-flops are set. In this illustration, there are only two states in which J–K flip-flops 51 through 54 are all set, i.e., decimal 31 and decimal 30 (lock-up state); therefore, logic circuit 17 needs only sense the signal states of J–K flip-flops 51 through 54 for detecting clock period 14. Lines 19 through 22, respectively, carry signals from J–K flip-flops 51 through 54 indicating those J–K flip-flops are set. NAND gate 61 is responsive to all binary one signals on lines 19 through 22 to supply a binary zero signal over line 62. This binary zero signal occurs only during clock period 14, and at all other times a binary one signal is supplied as shown in FIG. 4 by waveform 77. NAND gate 64 merely acts as an inverter circuit since it has only one input connection.

NAND circuit 64 supplies waveform 78 (the complement or inversion of waveform 77) over line 30 to clocked follower 31 for generating tthe multifrequency output waveform 35 as well as to NAND gate 65. NAND gate 65 selectively gates NRZ data signals on line 18 to NAND gate 56 which in turn controls the logic of operation of shift register 16. Clocked follower 31 consists of J–K flip-flop 80. Line 30 is connected to both the J and K inputs to make J–K flip-flop 80 jointly responsive to clock pulses on line 12 and a binary one signal from NAND gate 64. Therefore, waveform 35 changes state at the end of each clock period 14.

The logic of operation of shift register 16 is controlled by NAND gate 56. Gate 56 receives a first input signal from flip-flop 52 over line 20 and a second input (waveform 79) over line 81 from NAND gate 65 of logic circuit 17. The NAND circuit 56 output signal (waveform 76) on line 82 is determined by the signal state of J–K flip-flop 52 at all times, except during clock period 14. During clock period 14, NAND gate 56 is responsive to NRZ data signal 40 on line 18 to supply either a binary one or zero signal. Therefore, NAND gate 56 has no effect on the operation of shift register 16 except during clock period 14 when it determines whether shift register 16 will count to modulus 31 or modulus 29. When data signal 40 is a binary one signal during clock period 14, NAND gate 65 supplies a binary zero signal over line 81 to NAND gate 56. Irrespective of the signal state of J–K flip-flop 52, NAND gate 56 supplies a binary one signal to J–K flip-flop 53 K input. Since J–K flip-flop 53 is reset (see Table II, clock period 14), counter 16 progresses to clock period 17 omitting periods 15* and 16*, providing a counter, modulo 29.

Figure 4:
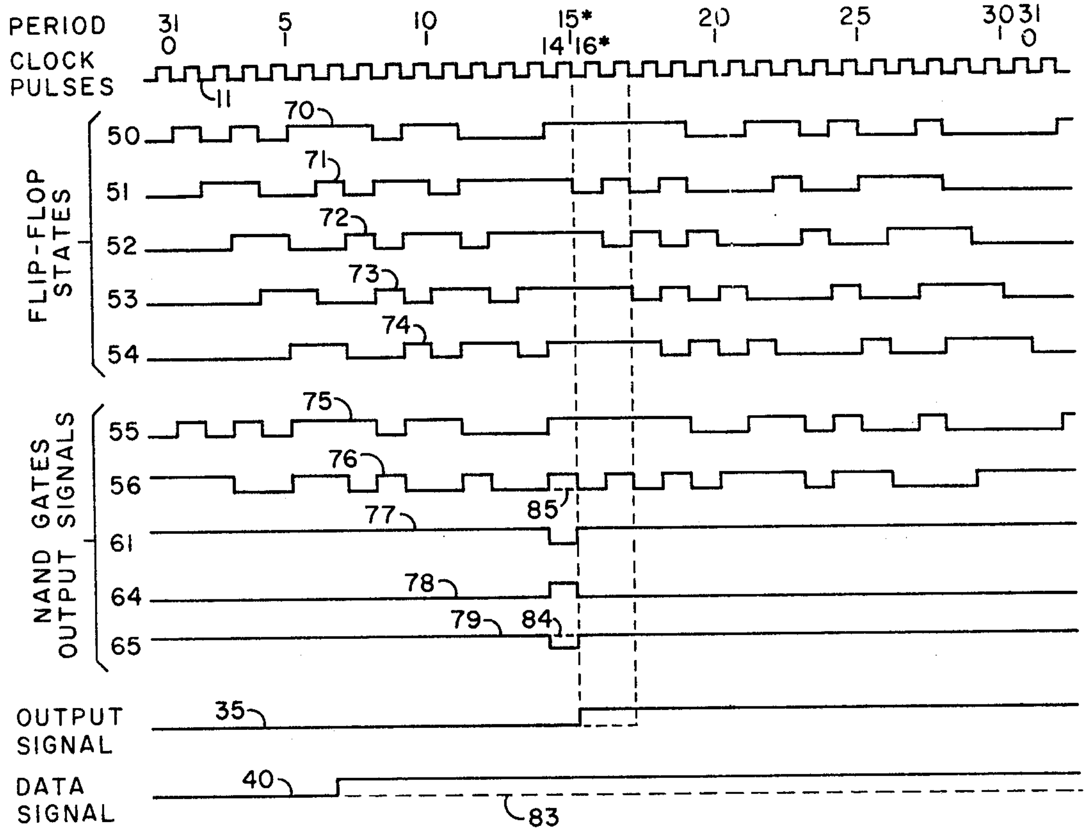
FIG. 4 is a set of idealized digital signal waveforms showing the operation of the shift-register counter of the FIG. 2 illustrated multifrequency signal generating channel.

On the other hand, when the data signal is a binary zero signal, as indicated in FIG. 4 by dotted line 83, NAND gate 65 supplies a binary zero signal through clock period 14 as indicated by two dashes 84 (FIG. 4), then NAND gate 56 supplies a binary zero signal during clock period 14, as indicated by two dashes 85. Table IV shows that the NAND gate 56 output signal will then be binary zero signal causing J–K flip-flop 53 to remain set. This action includes clock periods 15* and 16* in the counter cycle making the counter modulo 29.

By repeating the above-described counting cycles, the logic circuit 17 in conjunction with shift register 16 provides frequency dividing factors of 31 and 29 in accordance with data signal 40 supplied over line 18. Clocked follower 31 changes its signal output state at the end of each clock period 14 irrespective of whether the counter is supplying a frequency dividing factor of 29 or 31 to supply a square wave having one of two possible frequencies to bandpass filter 33.

The data signals on line 18 (preferably NRZ signals, FI1. 3, no limitation of stable clock pulse source 16 and the various FSK channels. The frequency dividing means in each FSK channel consisting of logic circuit 17 and gated shift register 16 resynchronizes the input data signals to the clock pulses through logic current circuit 17, being responsive to a selected signal state pattern of gated shift register 16. This dual function of frequency division and resynchronization provides a saving in equipment with improved operation.

Returning now to the description of NAND circuit 55, assume that gated shift register 16 is in the lock-up state, i.e., contains binary 01111. In such state, without NAND circuit 55 counter 16 is non-responsive to clock pulses 11; therefore, does not count. Assume line 62 is not connected to NAND gate 55, then J–K flip-flop 54 being set supplies a binary zero signal over line 57 to both J–K inputs of J–K flip-flop 50 making it non-responsive to clock pulse 11. Since J–K flip-flop 50 is in the reset state, a binary one signal is supplied over line 60 to NAND circuit 55 which is inverted to a binary zero signal on line 63. It should be remembered that without NAND circuit 55, J–K flip-flop 50 would have its normal output connected to both J–K inputs of J–K flip-flops 51. Therefore, a binary zero signal is supplied to J–K flip-flop 51 making it non-responsive to clock pulses 11. Since J–K flip-flop 51 is not responsive to clock pulses, J–K flip-flop 52 will not change state since it follows the state of flip-flop 51. Since flip-flop 52 is in the binary one state, a binary one signal is supplied to NAND circuit 56 causing it to supply a signal in accordance with the waveform 79 (FIG. 4).

When line 62 is connected to NAND gate 55, then J–K flip-flop 51 is toggled breaking the lock-up state by changing the register signal state pattern to that of clock period 28 (Table II). That is, during lock-up of gated shift register 16, NAND gate 61 supplies a binary zero signal over line 62 forcing NAND gate 55 to supply a binary one signal over line 63 irrespective of the signal state of J–K flip-flop 50. A binary one signal on line 63 forces J–K flip-flop 51 to be reset on the next occurring trailing edge of a clock pulse 11 causing gated shift register 16 to assume the signal state pattern of clock period 28, whereupon shift register 16 follows its normal counting sequence. Therefore, it is shown that gated shift register 16 will always break out from a lock-up state within one counting cycle, i.e., within one-half cycle of the output waveform 34.

In the illustrated embodiment, it so happens that a binary one data signal on line 18 also causes the counter to break out of the lock-up state through action of NAND gate 56. A binary zero signal has no effect on lock-up. With a binary one signal on line 18, NAND gate 65 supplies a binary zero signal to NAND gate 56. Then both inputs to NAND gate 56 are not binary one signals causing it to supply a binary one signal to the J–K flip-flop 53 K input. This action resets J–K flip-flop 53 at the next occurring negative going trailing edge of a clock pulse 11, breaking the lock-up state. This latter action should not be relied upon to effect walkout of the counter from the lock-up state.

I claim:

1. A multifrequency signaling system, including in combination, a clock signal source supplying a succession of clock signals, gated shift register means including a chain of interconnected multistable state devices having plural signal states and responsive to said clock signals to change counting states for each of said clock signals in repetitions of a first plurality of successive counting states, logic means for receiving a multisignal-state data signal and connected to said counting means for sensing the signal states of selective ones of said multistable state devices and jointly responsive to said data signal being in a predetermined one of said signal states and to said signal states to selectively cause said counting means to omit a predetermined number of said successive counting states during each repetition of said first plurality of successive counting states, and said logic means sensing and indicating a predetermined counting state of said gated shift register means to change its output signal amplitude to supply an output signal having a frequency in accordance with said multisignal state data signal.

2. The subject matter of claim 1 wherein said logic means is responsive to said one counting state to cause said counting means to omit certain ones of said successive counting states in accordance with the state of said data signal.

3. The subject matter of claim 2 wherein said gated shift register means includes individual gates each having binary signal supplying states and interposed between predetermined ones of said multistable state devices, and supplying said signal states to one of said multistable state devices for controlling its responsiveness to said clock signals, one of said gates being in one of said signal supplying states and responsive to said logic means indicating said predetermined counting state to switch to a second one of said signal supplying states to alter the counting sequence of said gated shift register.

4. The subject matter of claim 3 wherein said multistable state devices are J–K flip-flops, each having set and reset signal states, J and K signal input portions, and Q and $\overline{Q}$ output portions; and said gates are NAND gates, and wherein one of said predetermined ones of said J–K flip-flops receives said signal supplying state from said one gate.

5. The subject matter of claim 4 wherein said logic means includes a clocked J–K flip-flop supplying said output signal and receiving said clock signals, said clocked J–K flip-flop is switched in amplitude by said clock signal whenever said logic means indicates said predetermined counting state.

6. The subject matter of claim 5 wherein said predetermined selected ones of said J–K flip-flops are all but the first J–K flip-flop in the counting chain and are in a set state to form said predetermined counting state.

7. The subject matter of claim 6 wherein said one J–K flip-flop has its $\overline{Q}$ output connected to both J and K inputs of a second one of said J–K flip-flops, predetermined others of said J–K flip-flops having their respective J and K inputs connected respectively to $\overline{Q}$ and Q outputs of another J–K flip-flop and said NAND gates supplying signals to at least the K inputs of yet other ones of said J–K flip-flops.

8. A multifrequency signaling system including in combination, a clock pulse source supplying repetitive clock pulses, a plurality of frequency shifting channels each receiving said clock pulses and each having data signal input portions and each jointly responsive to data signals on said respective data input portions and to said clock pulses to respectively supply first or second signals having different frequencies, and each frequency shifting channel comprising a gated shift register receiving said clock pulses and responsive to each received clock pulses to change a gated shift register counting state, logic means in each frequency shifting channel connected to said gated shift register and pointly responsive to a selected one of said shift register counting states and to a data signal on said data signal input portion to alter the shift register sequence such that a cycle of shift register states require a different number of shift register counting states.

9. The subject matter of claim 8 further including clocked follower means receiving signals from said logic means and responsive thereto to change signal states each time said shift register passes through a predetermined shift register counting state and to supply an output signal having a frequency indicative of the number of signal states in the succession of states in the respective shift registers.

10. A multifrequency signaling system, including in combination, a shift register having first, second, third, fourth and fifth J-K flip-flops, each flip-flop having J, K and clock inputs and normal and complementary outputs and being in either a set or reset signal state, a source of clock pulses having a given pulse repetitive frequency connected to each of said J–K flip-flops, logic means comprising a first NAND gate connected to said normal outputs of said second, third, fourth and fifth J–K flip-flops and having an output, a second NAND gate receiving the output of said first NAND gate, a third NAND gate receiving the output of said second NAND gate and having a data input terminal, a fourth NAND gate receiving the output signal from said third NAND gate and the normal output from said third J–K flip-flop and having a normal output connected to the K input of said fourth J–K flip-flop, a fifth NAND gate receiving the complementary output of said first J–K flip-flop and the output signal of said first NAND gate and having an output terminal connected to both J and K inputs of said second J–K flip-flop, said J–K inputs of said third J–K flip-flops being respectively connected to the normal and complementary output portions of said second J–K flip-flop, said J input of said fourth J–K flip-flop being connected to said normal output of said third J–K flip-flop, said J and K inputs of said fifth J–K flip-flop being respectively connected to the normal and complementary output portions of said fourth J–K flip-flop, a J–K flip-flop follower having J and K inputs and a clock input, said J and K inputs being connected to the output of said second NAND gate and said clock input being connected to said source of clock pulses, and supplying a signal having a fundamental frequency equal to said pulse repetitive frequency divided by the modulus of the shift register.

11. Subject matter of claim 9 further including a like plurality of said shift registers, said FSK logic means and said J–K flip-flop followers each forming a separate channel and receiving clock pulses from said clock pulse source for supplying a plurality of multifrequency signals jointly derived from said clock pulse source and a plurality of independent data signals on respective ones of said data terminals.

References Cited

UNITED STATES PATENTS

| | | | | |
|---|---|---|---|---|
| 3,205,441 | 10/1962 | Likel | ------------- | 325—163 |
| 3,354,433 | 11/1967 | Minc | ------------- | 307—273 |

DONALD D. FORRER, Primary Examiner

J. O. FREW, Assistant Examiner

U.S. Cl. X.R.

307—215, 223; 207—221; 325—163; 328—37